UNITED STATES PATENT OFFICE.

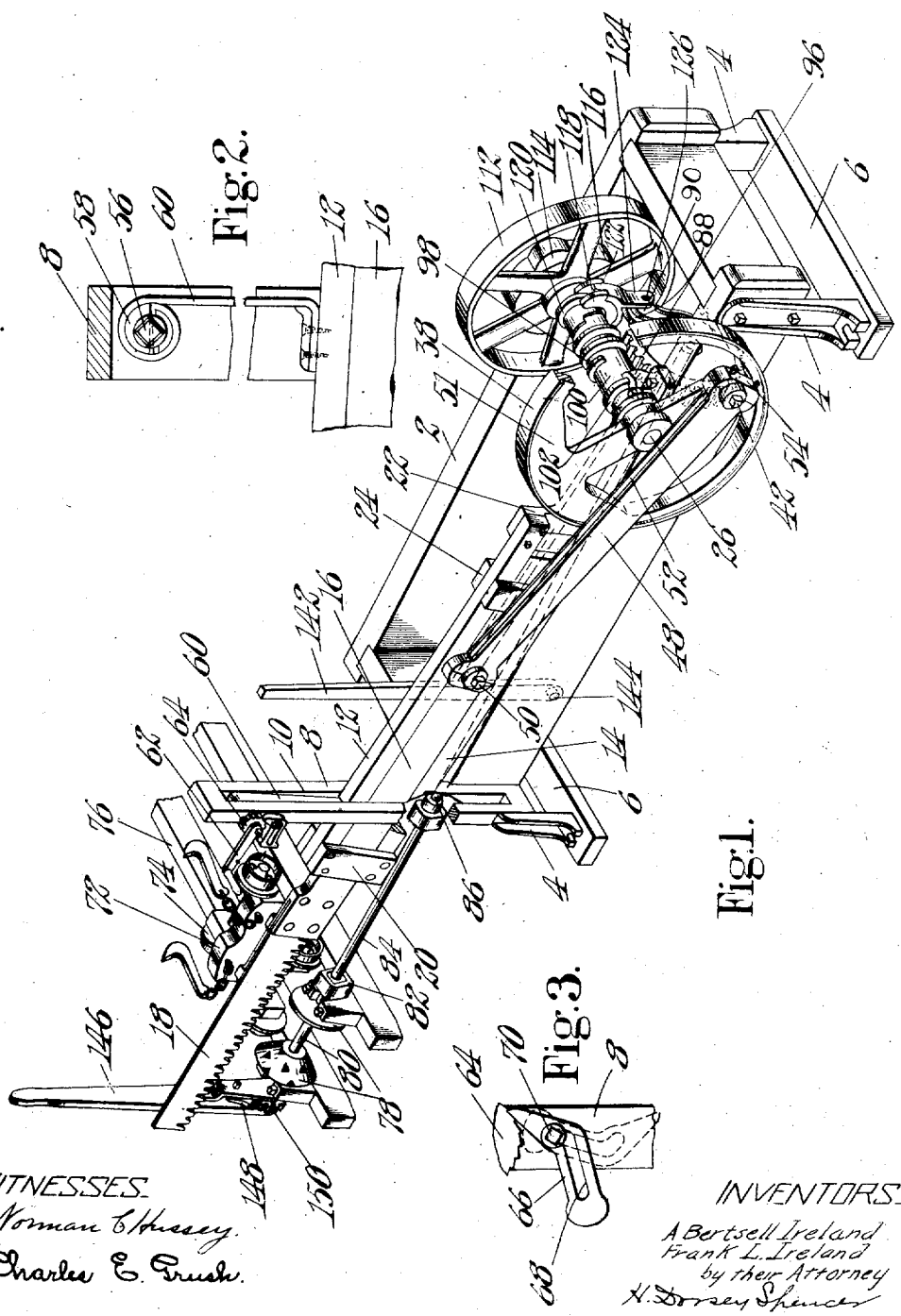

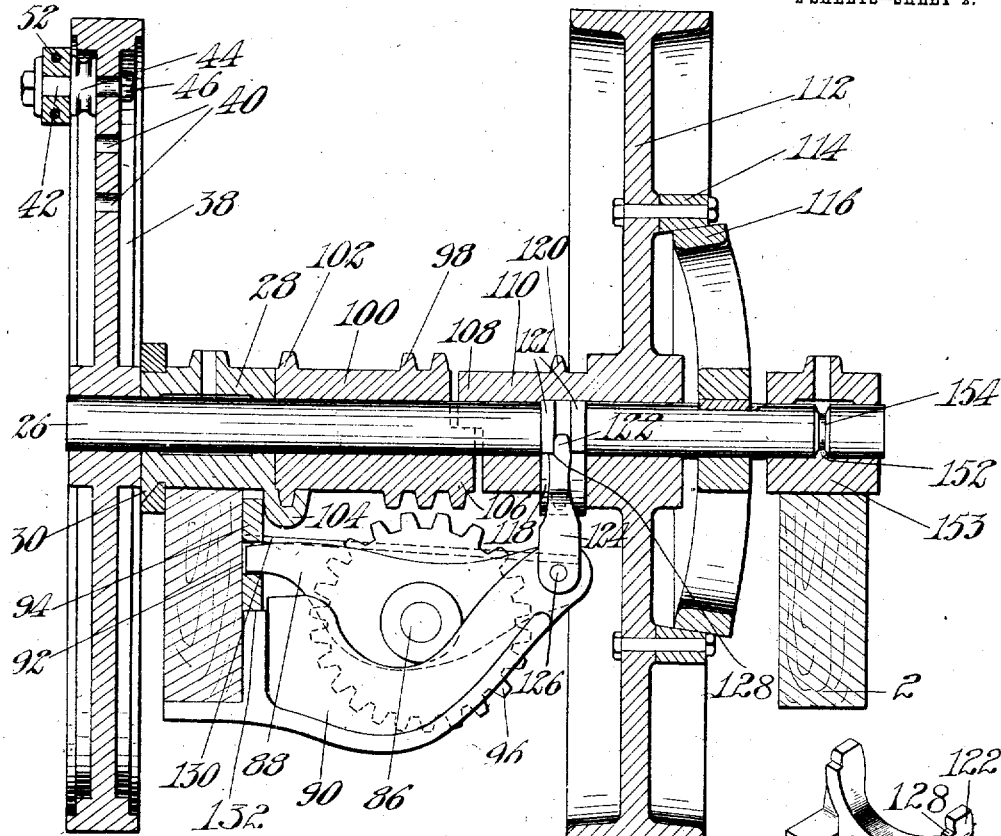
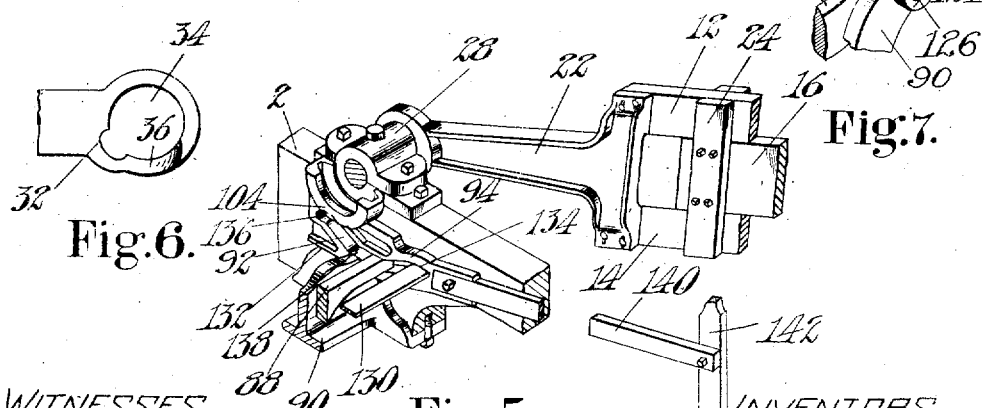

A BERTSELL IRELAND AND FRANK L. IRELAND, OF NORWICH, NEW YORK.

SAWING-MACHINE.

959,221. Specification of Letters Patent. Patented May 24, 1910.

Application filed August 28, 1909. Serial No. 515,030.

*To all whom it may concern:*

Be it known that we, A BERTSELL IRELAND and FRANK L. IRELAND, citizens of the United States, residing at Norwich, in the county of Chenango and State of New York, have invented certain Improvements in Sawing-Machines, of which the following description, in connection with the accompanying drawings, is a specification, like reference characters on the drawings indicating like parts in the several figures.

This invention relates to sawing machines and particularly to sawing machines in which the saw reciprocates.

As herein shown the invention is applied to a machine of the type known to the trade as "drag sawing machines", but it will be understood that the invention, in many of its aspects, is not limited to machines of this type.

One of the objects of the invention is to provide an improved sawing machine of the type above referred to which will be simple compact and durable in construction, rapid and efficient in operation, and which can be manufactured and put upon the market at a cost which will make it generally available.

Another object of the invention is to provide a machine in which the operation of the various mechanisms may be so completely and easily controlled by the operator that danger of injury either to the operator or to the machine will be obviated. To this end means will preferably be provided which, when actuated by the operator, will so automatically control the order of the operation of the various mechanisms that no one of the mechanisms can interfere with the operation of another.

More particularly the invention aims to provide an improved construction and arrangement of the means for guiding and supporting the saw whereby easier and more convenient manipulation of these parts will be permitted, and whereby, especially, more uniform and more effective operation of the saw is obtained.

In the illustrated preferred embodiment of the invention the means for guiding and supporting the saw is arranged to swing about an axis coinciding with the axis of rotation of the crank wheel or other means for transforming rotary movement of the driving means into reciprocating movement of the saw. As herein shown the saw is arranged to reciprocate along an extended radius of the crank wheel from which it is operated. By this arrangement it will be seen that the angle at which the power is applied to the saw, or to the saw stem, will be the same for all elevations of the saw. In another aspect, therefore, the invention may be said to comprise improvements in sawing machines of this type.

Other objects and features of the invention will be apparent from a consideration of the following description and claims in connection with the accompanying drawings in which—

Figure 1 is a perspective view of a machine embodying the invention, parts being broken away to expose to view other parts which would otherwise be wholly or partly hidden; Fig. 2 is a detail of the saw lifting mechanism; Fig. 3 is a detail of the pawl and ratchet used to lock the saw in raised position; Fig. 4 is a section of the machine on the line of the driving shaft; Fig. 5 is a broken detail perspective showing especially the means for controlling the order of actuation of the saw operating mechanism and the work feeding mechanism, and Fig. 6 is a detail of the hinge for the saw guide; Fig. 7 is a detail perspective of the clutch operating means.

The frame 2 of the machine, which may conveniently be formed of side and end pieces, preferably of wood, bolted together, is provided at or near its corners with bracket-like legs 4 which are so constructed that they permit the convenient attachment of the machine, by bolts or similar means, to a suitable support, or to suitable supports, the machine being herein shown as attached to cross-pieces 6.

At one of the corners at its forward end the frame 2 is provided with an upstanding portion 8, hereinafter referred to as the standard, which is located outside the side-piece against which it bears and which has formed in it a vertical guideway 10 for the saw supporting and guiding frame.

As herein shown the guiding and supporting frame comprises upper and lower guide members 12 and 14, preferably of wood, between which slides the saw stem 16 carrying the saw 18. At their forward ends the guide members 12 and 14 are adjustably spaced by spacing blocks 20 attached to the opposite sides of the guide members by bolts passing through elongated openings in said members, the blocks 20 forming lateral guides for the saw stem. At their rear ends the guide members 12 and 14 are spaced by attachment to the expanded forward end of a hinge plate or casting 22, adjustment being provided also at this end of each member by making the bolt holes in the casting somewhat elongated. The rear end of the saw stem 16 is guided and confined against lateral displacement by cross-pieces 24 attached to opposite sides of the saw stem by bolts passing through the cross-pieces and through said stem, said cross pieces overlapping the guide members 12 and 14.

The hinge plate 22 has a pivotal bearing concentric with the main shaft 26 upon the outer end of the bearing box 28 for said shaft. To confine the hinge plate 22 upon its bearing on the bearing box 28 a beveled lug 30 is provided on the underside of said bearing, which is received, when the parts are assembled, by an enlargement 32 in the opening 34 in the hinge plate, said enlargement 32, when the hinge plate is in operative position, being so angularly offset from its assembling position that during the operative movements of the hinge plate it does not again come into register with the lug 30. The opening 34 is provided along the path of the relative movement of the lug 30 and the hinge plate 22 with a beveled countersink 36 to receive the lug, the lug thus serving both to confine the hinge plate upon its bearing and to guide it in its oscillating movement thereon.

It will be noted that the hinge plate 22 is pivoted to swing between the side of the frame 2 and a crank wheel 38 attached to the outer end of the main shaft 26, the guide members 12 and 14 being attached to the outer face of the hinge plate so that the saw stem 16, guided between said members, is brought substantially into the plane of the crank wheel and reciprocates along an extended radius of said wheel.

The crank wheel 38 is provided upon one side of its center with a series of openings 40 at different radial distances from said center, to receive a wrist pin 42 provided with a spacing block 44 into which the wrist pin is preferably cast, the pin being confined in the selected one of the series of openings by a nut 46 threaded upon one end thereof. Movement of the wrist pin 42 from one to another of the series of openings 40 serves to give different throws to a pitman 48 by which the rotary movement of the crank wheel 38 is transformed into reciprocating movement of the saw stem 16, said pitman receiving the wrist pin 42 in a bearing in one end and receiving a second wrist pin 50, carried by the saw stem 16, in a bearing in its other end. This construction allows the machine to be readily adapted to use saws of different lengths. Upon the other side of its center the crank wheel 38 is provided with a counterbalance 51, preferably cast integral with said wheel. The pitman 48 and the saw stem 16, as well as the guide members 12 and 14, the spacing blocks 20 and the cross pieces 24, are preferably of wood, this material providing a light strong pitman and permitting the use of a saw stem and guides therefor having wide bearing surfaces. A construction is thereby secured in which there is lightness of the reciprocating parts, with the consequent freedom from vibration, and in which uprightness of the saw is insured, this latter condition being obviously essential to good sawing. Owing to the length of the stroke in machines of this type, lightness of the reciprocating parts is especially important.

Extending along the upper and lower sides of the pitman are rods 52 upon the ends of which are screwed nuts 54 to hold securely the adjustable wooden bearing boxes with which the pitman is provided at its respective ends.

To permit the log to be fed forward for the next cut or to allow a new log to be placed in position mechanism is provided for lifting the saw guide and support preferably having provision for locking the saw in its raised position. The illustrated mechanism comprises a crank shaft 56 having thereon a pulley 58, in a transverse opening in which is wedged one end of a strap or other suitable flexible means 60 connected at its other end to the guide member 12 within the guideway 10 of the standard 8. The term "strap," as here and hereinafter used, should be understood in a generic sense.

A crank 62 is provided by which the crank shaft may be turned to lift the saw supporting and guiding frame. When the machine is operating to make successive cuts in the same log, which will be fed forward by mechanism hereinafter to be described, there will be no necessity for locking the saw in raised position as the operator can hold the crank with one hand while he controls the feeding of the log and the starting and stopping of the saw with the other hand. However when a new log is to be placed in position it is usually desirable to lock the saw in raised position and for this purpose the crank shaft 56 is provided with a ratchet 64 adapted to be engaged by a weighted pawl 66 which has an operative and an inoperative position. The pawl 66 is provided with an L-shaped slot 68 in which is received the pivot 70. When the pawl is in the full line position in Fig. 3, its weighted end serves to keep its other end in engagement with the ratchet wheel 64. When, however, the pawl is moved to the dotted line position, Fig. 3, its weight will be so distributed with respect to the pivot 70 that it will not operatively engage the ratchet wheel 64.

The log to be operated upon is mounted upon a truck 72, which may be of any suitable or usual construction, said truck having wheels 74 which travel upon track rails 76. The forward end of the log rests upon conical spur wheels 78 upon a short shaft 80 mounted in bearings carried by the rails 76. At the end nearer the frame 2 the shaft 80 is provided with a squared socket 82 which receives the squared end of a removable connecting shaft 84 having another squared end which enters a similar squared socket in the forward end of the feed shaft 86. At its rear end the shaft 86 has a bearing in a swinging bracket 88 pivoted at one end upon a stationary bracket 90 attached to a side of the frame 2. The other end of the swinging bracket 88 is reduced and enters a cam slot 92 in a cam slide 94, the slot 92 being so shaped that longitudinal movement of the slide 94 serves to raise and lower this end of the swinging bracket 88.

Mounted upon the shaft 86 near the bracket 88 is a gear wheel 96 arranged to be brought into and out of mesh with a worm 98 formed upon a sleeve 100 surrounding the main shaft 26. A flange 102 upon one end of the sleeve 100 entering a semicircular groove in a downward extension 104 of the bearing box 28 keeps the sleeve from endwise movement on the shaft 26. At its other end the sleeve 100 is provided with jaws or projections 106 which engage corresponding projections upon a second sleeve 110 integral with the hub of the loose driving pulley 112. The pulley 112 is provided with friction blocks 114 constructed and arranged to engage the conical rim of a clutch pulley 116 keyed upon the shaft 26.

The pulley 112, which is loose upon the shaft 26, is normally rotated and causes to rotate with it the sleeve 100. When the pulley 112 is moved toward the right in Fig. 4 to effect the engagement of the blocks 114 with the conical rim of the clutch pulley 116, as shown in this figure, the shaft 26 and the crank wheel 38, keyed thereto, will be rotated with the pulley 112.

The means for moving the pulley 112 into and out of clutching relation to the pulley 116 comprises a yoke 118 having a semicircular groove in which travels a flange 120 upon the sleeve portion 110 of the hub of the pulley 112, said yoke having upon opposite sides of the diameter of the shaft 26 pairs of ears 121 between which are received the ends 122 of a forked lever 124 fulcrumed at 126 to turn about the same center as that about which the bracket 88 swings. A shoulder 128 upon each of the fork members of the lever 124 engages an ear of the yoke 118 and serves to support the yoke. Rigidly attached to the lever 124 near the forward end of its fulcrum pin 126 is a spring operating arm 130. The free end of the spring arm 130 enters the cam slot 92 in the cam slide 94. The lower edge of the slide 94 rests upon a laterally extended upper edge 132 of the bracket 90, see Fig. 5. The upper edge of the slide 94 is guided between the side of the frame 2 and the downward extension 104 of the bearing box 28.

As shown in Fig. 5 the cam slot 92 in the cam slide 94 is provided at its forward end with a horizontal rest 134 for the end of the spring arm 130 and at its rear end with a horizontal rest 136 for the reduced end of the swinging bracket 88. Substantially midway between these ends is an extended low portion 138 with substantially equal inclines leading from the ends of the slot to the said intermediate low portion. The swinging bracket 88 and the spring arm 130 are so spaced apart that both may rest at the same time in the low portion 138 of the cam slot 92, or that one may rest in its end of the slot while the other is in the low portion 138 and vice versa.

The cam slide is connected by a rod 140 to a lever 142 fulcrumed at 144 upon the side of the frame 2. When the cam slide has been moved by the lever 142 into the position shown in Fig. 5, the pulley 112 will be in the position shown in Fig. 4, in which it is clutched through the clutch pulley 116 to the main shaft 26, and the gear wheel 96 will be disengaged from the worm 98. In this position of the parts the saw will be reciprocated through its connections with the crank wheel 38 and the feed mechanism will be inoperative. If the operator moves the slide 94 toward the right in Fig. 5 until the end of the spring arm 130 and the end of the bracket 88 are both in the low portion 138 of the slot 92, the feed mechanism will be left in its inoperative condition and the saw operating mechanism will also be rendered inoperative. If, however, the operator continues to move the slide 94 toward the right in Fig. 5, the end of the swinging bracket 88 will be raised into the end 136 of the slot 92, thereby bringing the gear 96 into mesh with the worm 98 and starting the feed mechanism. The end of the spring arm 130 will still be in the low part 138 of the cam slot thereby maintaining the saw operating mechanism inoperative during the feeding operation. It will thus be seen that the feed mechanism and the saw operating mechanism can both be inoperative at the same time, but that neither can operate while the other is operating which insures against accidents both to the machine and to the operator.

Means is provided by which the feeding mechanism can be operated by hand, this means being principally useful in moving the log back if it has been overfed by the power and in moving a log into position when the power is not connected. The illustrated means comprises a lever 146 fulcrumed upon the shaft 80 and carrying a pawl 148 which is arranged to engage a ratchet wheel 150 upon the said shaft, the pawl 148 being so constructed that it may be moved into position to engage and turn the ratchet wheel 150 and with it the shaft 80 in either direction.

The operation of the machine will be readily understood from the foregoing detailed description but it may be briefly recapitulated as follows: The saw guide and support, having been raised by the crank 62 and the mechanism operated thereby, is locked in its raised position by the engagement of the pawl 66 with the ratchet wheel 64. The lever 146 having been turned down into its lowermost position, a log is rolled upon the truck 72 with its forward end resting upon the spur wheels 78. Let it be assumed that the log has been rolled into position for the first cut. The pawl 66 is now moved into its inoperative position so that the saw will be free to follow its cut. The lever 142, which at this time is in its upright or mid position, in which position of the lever both the feed mechanism and the saw operating mechanism are inoperative, is now moved toward the right in Fig. 1, which would be toward the left in Fig. 5, thus through the cam 92 in the cam slide 94 and the spring arm 130 of the forked lever 122 moving the pulley 112 into clutching engagement with the clutch pulley 116 to start the saw operating mechanism. The spring arm 130 and the friction clutch together afford means by which the saw may be started slowly and gently, if desired. The log having been cut through, the lever 142 is again moved to mid position to stop the saw, the saw is lifted to permit the log to be fed along and the lever is then moved toward the left in Fig. 1, or toward the right in Fig. 5, to start the feed mechanism, the operator holding the saw in raised position at this time by means of the crank 62. The log having been fed, the lever 142 is again moved to its other extreme position, preferably by a continuous movement, thereby causing the feed mechanism to be thrown out of operation and the saw operating mechanism to be thrown into operation.

It will be noted that the means for rendering the feed mechanism and the saw operating mechanism operative and inoperative comprises two levers, the forked lever 122, having the spring arm 130, and the swinging bracket 88, controlled by a single cam which is so constructed and arranged that the said two mechanisms cannot be operative at the same time, but that either may be operative while the other is inoperative and that both may be inoperative at once. Furthermore by a single movement of the lever 142 from one of its extreme positions to the other there will be a change from a condition in which one of the mechanisms is operative and the other inoperative to one in which both are inoperative and then to one in which the relative conditions of operativeness and inoperativeness are reversed.

Endwise movement of the shaft 26 when the pulley 112 is moved in the direction to bring the friction blocks 114 into clutching engagement with the clutch pulley 116 is prevented by a rib 152 in the shaft bearing 153 which enters a groove 154 in the shaft 26.

Having described our invention, what we claim as new and desire to secure by Letters Patent of the United States is:—

1. A sawing machine having, in combination, saw operating mechanism and work feeding mechanism, a power driven pulley with which each of said mechanisms may be operatively connected, and means for effecting an operative connection between one of said mechanisms and said pulley constructed to interrupt the operative connection between the other of said mechanisms and said pulley.

2. A sawing machine having, in combination, saw operating mechanism and work feeding mechanism, a power driven pulley with which each of said mechanisms may be operatively connected, and a single means for effecting an operative connection between one of said mechanisms and said pulley and for interrupting the operative connection between the other of said mechanisms and said pulley, said means having provision for maintaining both of said mechanisms in inoperative condition.

3. A sawing machine having, in combination, saw operating mechanism and work feeding mechanism, power driven means with which each of said mechanisms may be operatively connected, and a single means for effecting an operative connection between either of said mechanisms and said power driven means.

4. A sawing machine having, in combination, saw operating mechanism and work feeding mechanism, power driven means with which each of said mechanisms may be operatively connected, and a single means for effecting, only in succession, operative connections between said two mechanisms and said power driven means, said means for effecting operative connections having provision for maintaining both of said mechanisms in inoperative condition.

5. A sawing machine having, in combination, saw operating mechanism and work feeding mechanism, power driven means with which each of said mechanisms may be operatively connected, means for effecting an operative connection between either of said mechanisms and said power driven means comprising a cam constructed and arranged to interrupt the operative connection between one of said mechanisms and said power driven means before the operative connection between the other of said mechanisms and said power driven means can be effected, and means under the control of the operator for operating said cam.

6. A sawing machine having, in combination, saw operating mechanism and work feeding mechanism, power driven means, and controlling means through which operative connections between said power driven means and said mechanisms are effected and interrupted comprising a cam slide constructed and arranged to effect by a single movement in a single direction changes in the relative conditions of said mechanisms from one in which one of the mechanisms is operative and the other inoperative to one in which both are inoperative and then to a relative condition of operativeness and inoperativeness which is the reverse of the first condition.

7. A sawing machine having, in combination, saw operating mechanism and work feeding mechanism, power driven means, and means for effecting an operative connection between either of said mechanisms and said power driven means comprising two levers for the respective mechanisms having a common fulcrum and a single cam by which said levers are operated.

8. A sawing machine having, in combination, saw operating mechanism, a driving shaft, a normally rotated pulley and a likewise normally rotated worm loose upon said shaft, means for clutching said pulley to said shaft to actuate the saw operating mechanism, and work feeding mechanism comprising a gear arranged to be moved into and out of operative engagement with said worm.

9. A sawing machine having, in combination, saw operating mechanism, a driving shaft, a normally rotated pulley and a likewise normally rotated worm loose upon said shaft, means for clutching the pulley to the shaft to actuate the saw operating mechanism, work feeding mechanism comprising a gear arranged to be moved into and out of operative engagement with said worm, and means for controlling the order of operation of said mechanisms constructed to prevent the engagement of the gear with the worm when the pulley is clutched to the shaft and vice versa.

10. A sawing machine having, in combination, saw operating mechanism and work feeding mechanism, power driven means with which each of said mechanisms may be operatively connected, means for frictionally connecting one of said mechanisms with the power driven means, means for positively connecting the other of said mechanisms with the power driven means, and a single means for controlling the operation of said two connecting means.

11. A sawing machine having, in combination, saw operating mechanism and work feeding mechanism, power driven means with which each of said mechanisms may be operatively connected, means for frictionally connecting the saw operating mechanism with the power driven means, means for positively connecting the work feeding mechanism with the power driven means, and a single means for controlling the operation of said two connecting means.

12. A sawing machine having, in combination, a reciprocating saw, a crank wheel for reciprocating said saw, a guide and support for the saw arranged to swing about the axis of rotation of said crank wheel, work feeding mechanism, a normally rotated pulley, means for forming a frictional driving connection between said pulley and said crank wheel, means for forming a positive driving connection between said pulley and said work feeding mechanism, and a single means for controlling said two connecting means constructed to cause them to operate in succession.

13. A sawing machine having, in combination, a reciprocating saw having a wooden saw stem, a guide for said saw stem comprising upper and lower wooden guide members, a hinge plate by which said guide members are connected at one end and by which they are spaced, a pair of spacing blocks connected to opposite sides of said guide members at their ends remote from said hinge plate and forming lateral guides for the saw stem, and a single pair of guiding blocks connected to opposite sides of the saw stem at a point remote from its attachment to the saw, said guiding blocks overlapping said guide members upon opposite sides.

14. A sawing machine having, in combination, a reciprocating saw having a wooden saw stem, a crank wheel for reciprocating said saw, a guide for said saw stem comprising upper and lower guide members, also of wood, a hinge plate to which said guide members are connected at one end and by which they are adjustably spaced, said hinge plate being arranged to turn about the axis of rotation of said crank wheel, a pair of spacing blocks connected to opposite sides of said guide members at or near their ends remote from the hinge plate and forming lateral guides for the saw stem, a single pair of guiding blocks connected to opposite sides of the saw stem at a point remote from its attachment to the saw, said guiding blocks overlapping said guide members on opposite sides, and a pitman connecting said crank wheel with said saw stem at a point between the guiding blocks and the saw.

15. In a sawing machine, a wooden pitman having adjustable wooden bearing boxes for the wrist pins, and means for holding said boxes in adjusted position comprising rods extending the entire length of the pitman upon opposite sides thereof.

16. In a sawing machine, a reciprocating saw, a driving shaft, means operated from said shaft for reciprocating said saw, a bearing box surrounding said shaft, a support and guide for the saw hinged upon the bearing box, a hinge plate by which said support and guide is carried having a bearing opening provided with an enlargement, and means integral with said box for locking said hinge plate thereon arranged to register with the enlargement in the opening in the hinge plate when said hinge plate is turned to a certain position outside the range of its operative movement.

17. In a sawing machine, a reciprocating saw, a driving shaft, means operated from said shaft for reciprocating said saw, a bearing box surrounding said shaft and provided with an integral, shouldered outside bearing, a support and guide for the saw hinged upon said outside bearing, said hinge connection comprising a hinge plate turning on said outside bearing, and means integral with said box for locking said hinge plate between said means and said shoulder constructed to guide said hinge plate in its swinging movement, said means and said hinge plate being constructed to register for separation or for assembling when said hinge plate is turned to a certain position outside the range of its operative movement.

In testimony whereof we have signed our names to this specification in the presence of two subscribing witnesses.

A BERTSELL IRELAND.
FRANK L. IRELAND.

Witnesses:
 DAVID F. LEE,
 EDWIN F. GIBSON.

---

Correction in Letters Patent No. 959,221.

It is hereby certified that in Letters Patent No. 959,221, granted May 24, 1910, upon the application of A. Bertsell Ireland and Frank L. Ireland, of Norwich, New York, for an improvement in "Sawing-Machines," an error appears requiring correction as follows: The drawings forming part of said Letters Patent should have been corrected as directed by the patentee in an amendment duly filed before the issue of the patent, *to illustrate part 114 in figure 1 as being bolted to the spoke of the wheel 112*, in accordance with the illustration in figure 4; and that the said Letters Patent should be read with this correction therein that the same may conform to the record of the case in the Patent Office.

Signed and sealed this 17th day of January, A. D., 1911.

[SEAL.]

C. C. BILLINGS,
*Acting Commissioner of Patents.* man having adjustable wooden bearing boxes for the wrist pins, and means for holding said boxes in adjusted position comprising rods extending the entire length of the pitman upon opposite sides thereof.

16. In a sawing machine, a reciprocating saw, a driving shaft, means operated from said shaft for reciprocating said saw, a bearing box surrounding said shaft, a support and guide for the saw hinged upon the bearing box, a hinge plate by which said support and guide is carried having a bearing opening provided with an enlargement, and means integral with said box for locking said hinge plate thereon arranged to register with the enlargement in the opening in the hinge plate when said hinge plate is turned to a certain position outside the range of its operative movement.

17. In a sawing machine, a reciprocating saw, a driving shaft, means operated from said shaft for reciprocating said saw, a bearing box surrounding said shaft and provided with an integral, shouldered outside bearing, a support and guide for the saw hinged upon said outside bearing, said hinge connection comprising a hinge plate turning on said outside bearing, and means integral with said box for locking said hinge plate between said means and said shoulder constructed to guide said hinge plate in its swinging movement, said means and said hinge plate being constructed to register for separation or for assembling when said hinge plate is turned to a certain position outside the range of its operative movement.

In testimony whereof we have signed our names to this specification in the presence of two subscribing witnesses.

A BERTSELL IRELAND.
    FRANK L. IRELAND.

Witnesses:
 DAVID F. LEE,
 EDWIN F. GIBSON.

---

Correction in Letters Patent No. 959,221.

It is hereby certified that in Letters Patent No. 959,221, granted May 24, 1910, upon the application of A. Bertsell Ireland and Frank L. Ireland, of Norwich, New York, for an improvement in "Sawing-Machines," an error appears requiring correction as follows: The drawings forming part of said Letters Patent should have been corrected as directed by the patentee in an amendment duly filed before the issue of the patent, *to illustrate part 114 in figure 1 as being bolted to the spoke of the wheel 112*, in accordance with the illustration in figure 4; and that the said Letters Patent should be read with this correction therein that the same may conform to the record of the case in the Patent Office.

Signed and sealed this 17th day of January, A. D., 1911.

[SEAL.]

C. C. BILLINGS,
    *Acting Commissioner of Patents.*

It is hereby certified that in Letters Patent No. 959,221, granted May 24, 1910, upon the application of A. Bertsell Ireland and Frank L. Ireland, of Norwich, New York, for an improvement in "Sawing-Machines," an error appears requiring correction as follows: The drawings forming part of said Letters Patent should have been corrected as directed by the patentee in an amendment duly filed before the issue of the patent, *to illustrate part 114 in figure 1 as being bolted to the spoke of the wheel 112*, in accordance with the illustration in figure 4; and that the said Letters Patent should be read with this correction therein that the same may conform to the record of the case in the Patent Office.

Signed and sealed this 17th day of January, A. D., 1911.

[SEAL.]

C. C. BILLINGS,
*Acting Commissioner of Patents.*